United States Patent [19]

Maruyama et al.

[11] Patent Number: 5,267,245
[45] Date of Patent: Nov. 30, 1993

[54] ISDN COMMUNICATION CONTROL UNIT AND CONTROL METHOD

[75] Inventors: Kazuhiko Maruyama, Kasugai; Yosinori Tuzita; Tomoyuki Yukawa, both of Owariasahi; Toru Saito, Yamato; Yutaka Kawakita, Yokohama, all of Japan

[73] Assignees: Hitachi, Ltd.; Hitachi Communication System, Inc., Tokyo, Japan

[21] Appl. No.: 659,598

[22] Filed: Feb. 21, 1991

[30] Foreign Application Priority Data

Mar. 7, 1990 [JP] Japan ............................... 2-53817

[51] Int. Cl.$^5$ .............................................. H04Q 11/04
[52] U.S. Cl. .................................. 370/109; 370/110.1; 379/94; 379/96
[58] Field of Search ................. 370/110.1, 111, 94.1, 370/94.2, 58.1, 58.2, 60.1, 81, 99, 109, 118; 379/93, 94, 96

[56] References Cited

U.S. PATENT DOCUMENTS

| | | | |
|---|---|---|---|
| 4,546,212 | 10/1985 | Crowder, Sr. | 370/76 |
| 4,791,629 | 12/1988 | Burns et al. | 370/94.1 |
| 4,965,795 | 10/1990 | Coffelt et al. | 370/13 |
| 4,995,073 | 2/1991 | Okata et al. | 370/110.1 |
| 4,996,685 | 2/1991 | Farese et al. | 370/58.1 |
| 5,042,028 | 8/1991 | Ogawa | 370/110.1 |
| 5,051,992 | 9/1991 | Taniguchi et al. | 370/110.1 |

FOREIGN PATENT DOCUMENTS

| | | |
|---|---|---|
| 62-2745 | 1/1987 | Japan . |
| 62-49754 | 3/1987 | Japan . |
| 62-97446 | 5/1987 | Japan . |
| 62-125577 | 6/1987 | Japan . |
| 62-297929 | 12/1987 | Japan . |
| 63-273933 | 11/1988 | Japan . |

*Primary Examiner*—Douglas W. Olms
*Assistant Examiner*—Melvin Marcelo
*Attorney, Agent, or Firm*—Fay, Sharpe, Beall, Fagan, Minnich & McKee

[57] ABSTRACT

A communication control unit for integrated service digital network (ISDN) is disclosed. The ISDN communication control unit includes a data communication adapter for transmitting and receiving data to and from the ISDN and a voice adapter for transmitting and receiving voice data received from the ISDN, through the data communication adapter. The voice adapter includes a memory for storing voice data, a compression and expansion circuit for voice data, a temporary storage circuit for voice data, a monitor unit for voice data, a communication path change-over circuit for changing over a communication path between said temporary storage circuit, said monitor circuit and the ISDN, and a control unit for controlling these. A communication path is changed over by the communication path change-over circuit, to mutually transmit and receive voice data between the temporary storage circuit, the monitor circuit and the ISDN.

12 Claims, 12 Drawing Sheets

(D/A CONVERSION CIRCUIT↔ISDN)

(ISDN →DATA TEMPORARY STORAGE CIRCUIT)

(D/A CONVERSION CIRCUIT↔DATA TEMPORARY STORAGE CIRCUIT)

(DATA TEMPORARY STORAGE CIRCUIT→ISDN)

ISDN COMMUNICATION CONTROL UNIT AND CONTROL METHOD

BACKGROUND OF THE INVENTION

The present invention relates to a control unit and a control method for the control unit for ISDN communication, and more particularly to a control unit and a control method for the control unit for ISDN communication in which input and output paths for voice data can be changed over and a storage function of voice data can be improved.

A conventional ISDN (Integrated Service Digital Network) communication control unit is structured such that voice information transmitted from terminals other than its own station is stored in a storage unit of a terminal of the own station and the voice information is outputted from the speaker of the own station terminal, as disclosed in JP-A No. 62-2745.

According to the prior art, no consideration is given to the case where a voice input path is changed over but the voice input path is fixed. Therefore, it is not possible to change over voice input and output paths such as to store voice information inputted from the own station in the storage unit of the own station, to store voice information inputted from another station in the own station or to transfer voice information transmitted from the other station to a further separate station.

Further, according to the prior art, a large memory capacity is required in the storage unit to store all voice information.

SUMMARY OF THE INVENTION

In the light of the above-described problems of the prior-art technique, it is an object of the present invention to provide a control unit and a control method for the control unit for ISDN communication in which a voice input path can be changed over when necessary.

It is another object of the present invention to prevent inefficient use of a memory by minimizing quantity of voice information to be stored through elimination of unnecessary voiceless portions or noise in voice data.

It is still another object of the present invention to solve the following problems which are anticipated to occur as secondary or subsequent problems when the above-described problems of the prior-art technique are to be solved.

First, in the case of storing voice data in the memory by a Direct Memory Access (DMA) method, it becomes impossible to store the voice data in the memory when a DMA transfer between the memory and a compression and expansion circuit has overflowed. As a result, it becomes impossible to store voice data until a next DMA is stated. Therefore, an occurrence of a problem that voice data is interrupted during this period is anticipated. In order to solve this problem, the present invention has an object of preventing interruption of voice data during a period from when a DMA has been terminated to when a next DMA transfer is started by securely storing the voice data during this period even in the case where voice data of a number of bytes equal to or above the number of bytes that can be transmitted in one DMA transfer is stored in the memory. By this arrangement, a problem that it becomes difficult to listen to voice data at the time of a reproduction of this data, can be prevented.

Next, in the present invention, a voice adapter for exclusive use for voice data and a data communication adapter for exclusive use for data communication are provided. When these adapters are allocated to two channels of a channel B1 and a channel B2 of the ISDN, it is considered possible to arrange such connections as, for example, the connection of the channel B1 to the voice adapter for exclusive use for voice data and the connection of the channel B2 to the data communication adapter for exclusive use for image data. However, the ISDN system is a system for exchanging data between an ISDN side and terminal equipment by suitably changing over the channels B1 and B2 in accordance with the state of using the line, etc. Therefore, when the channels are fixed as described above, there occurs a problem that desired information cannot be exchanged by using the channels (B1 and B2) decided through communication with the ISDN side. Accordingly, the present invention also has an object of enabling the exchange of voice data or normal data by using channels decided through communication with the ISDN side.

In order to achieve the above objects, the following arrangements are made.

The communication control unit for ISDN according to the present invention comprises a data communication adapter provided within a terminal for carrying out data communication including voice data communication with the other terminal through the ISDN, to exchange data with the ISDN, and a voice adapter for receiving voice data received from the ISDN through the data communication adapter and for storing the received voice data in a storage unit. The voice adapter comprises a monitor unit for monitoring voice data and a communication path change-over unit for changing a path, which enables transmission and receiving of voice data between the communication adapter and the storage unit, between the communication adapter and the monitor unit and between the monitor unit and the storage unit respectively.

Further, the communication control unit for ISDN according to the present invention comprises a data communication adapter provided within a terminal for carrying out data communication including voice data communication with the other terminal through the ISDN, to exchange data with the ISDN, and a voice data adapter for receiving voice data received from the ISDN through the data communication adapter and for storing the received voice data in a storage unit. The voice adapter comprises a monitor unit for monitoring voice data, a temporary storage unit for temporarily storing voice data, and a communication path change-over unit for changing a path, which enables transmission and receiving of voice data between the communication adapter and the voice data temporary storage unit, between the communication adapter and the monitor unit and between the monitor unit and the voice data temporary storage unit respectively.

Further, the communication control unit for ISDN according to the present invention comprises a data communication adapter provided within a terminal for carrying out data communication including voice data communication with the other terminal through the ISDN, to exchange data with the ISDN, and a voice data adapter for receiving voice data received from the ISDN through the data communication adapter and for storing the received voice data in a storage unit. The voice adapter has a storage control unit which decides presence or absence of voice based on the level of voice data inputted to the voice adapter and stores in the storage unit only voice data for which decision has been made that voice is present and voice data within a predetermined valid voiceless section that is inputted following the above voice data for which decision has been made that voice is present.

Further, the communication control unit for ISDN according to the present invention comprises a data communication adapter provided within a terminal for carrying out voice data communication including data communication with the other terminal through a channel D for a control signal of the ISDN and channels B1 and B2 for information, to exchange data with the ISDN, and a voice adapter for receiving voice data received from the ISDN through the data communication adapter and for storing the received data in the storage unit. The data communication adapter comprises a decision unit which analyzes the contents of the channel D received from the above ISDN, decides whether data received is voice data or normal data other than voice data and decides whether a channel used for receiving data is the channel B1 or the channel B2, and a switching unit which changes over a destination of inputted data in accordance with a result of the above decision.

Further, the communication control unit for ISDN according to the present invention comprises a data communication adapter for carrying out data transmission to and receiving from the ISDN, and a voice adapter for transmitting and receiving voice data received from the ISDN through the data communication adapter. The voice adapter comprises: a storage unit for storing voice data connected to the bus of a main control section of a terminal unit; a compression and expansion unit for compressing or expanding voice data connected to the storage unit; a temporary storage unit for temporarily storing voice data connected to the compression and expansion unit; a monitor unit for monitoring voice data; a communication path change-over unit for changing over a communication path with the ISDN through the temporary storage unit, the monitor unit and the data communication adapter; an input unit for inputting control information in the control unit; and a control unit for controlling each of the above units, which controls the communication path change-over unit based on control information inputted from the input unit and transmits and receives voice data by changing over a communication path with the ISDN through the temporary storage unit, the monitor unit and the data communication adapter.

Further, the control method for the communication control unit for ISDN according to the present invention comprises, in the voice data adapter: a step for inputting information relating to the change-over operation of the change-over unit; a step for changing over a communication path of voice data between the temporary storage circuit, the monitor circuit and the ISDN by the change-over unit based on the inputted information; a step for temporarily storing voice data from/to the change-over unit in the temporary storage circuit; a step for compressing/expanding voice data from/to the temporary storage circuit by the compression and expansion circuit; a step for writing/reading voice data from/to the compression and expansion circuit to/from the memory; and a step for monitoring voice data from the change-over unit and transmitting the voice data to the change-over unit.

According to the control unit for ISDN communication of the present invention, since the above-described communication path change-over unit is provided at the voice adapter side, it is possible to provide the ISDN communication control unit which enables free change-over of input and output paths for voice data.

Further, according to the control unit for ISDN communication of the present invention, since the data temporary storage unit is provided at the voice adapter side, data is stored in the storage unit even if a DMA transfer has overflowed, so that it is possible to prevent extinction or interruption of voice data that has been read from the storage unit.

Further, according to the control unit for ISDN communication of the present invention, the storage control unit is provided at the voice adapter side, which decides presence or absence of a voice based on the level of voice data inputted to the voice adapter and stores in the storage unit only voice data for which a decision has been made that the voice is present and voice data within a predetermined valid voiceless section that is inputted following the above voice data for which a decision has been made that the voice is present. Therefore, it is possible to prevent storage of unnecessary voice data or noise, thereby to effectively utilize the storage unit.

Further, according to the control unit for ISDN communication of the present invention, there are provided at the communication adapter side, the decision unit which analyzes the contents of the channel D received from the ISDN, decides whether data received is voice data or normal data other than voice data and decides whether a channel used for receiving data is the channel B1 or the channel B2, and the switching unit which changes over a destination of inputted data in accordance with a result of the above decision. Therefore, it is possible to process voice data and normal data by using a predetermined channel determined based on the communication with the ISDN.

BRIEF DESCRIPTION OF THE DRAWINGS the present invention will become apparent by reference to the following description and accompanying drawings wherein.

DESCRIPTION OF THE PREFERRED EMBODIMENTS

The present invention will be described in further detail with reference to embodiments shown in the attached drawings.

Figure 2:
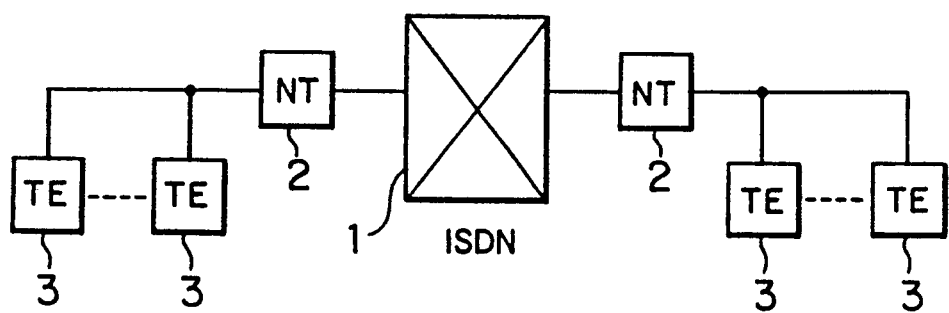
FIG. 2 is a block diagram showing the system configuration of ISDN communication.

FIG. 2 is a block diagram showing the general system structure of the ISDN. As shown in FIG. 2, a plurality of terminal equipments (TE) 3 are connected with a network equipment (NT) 2 and a plurality of NT 2 are connected with an ISDN 1. Data outputted from one TE 3 passes through the ISDN 1 via the NT 2 and is transmitted to the other TE 3 via the NT 2 at the other terminal side.

Figure 1:
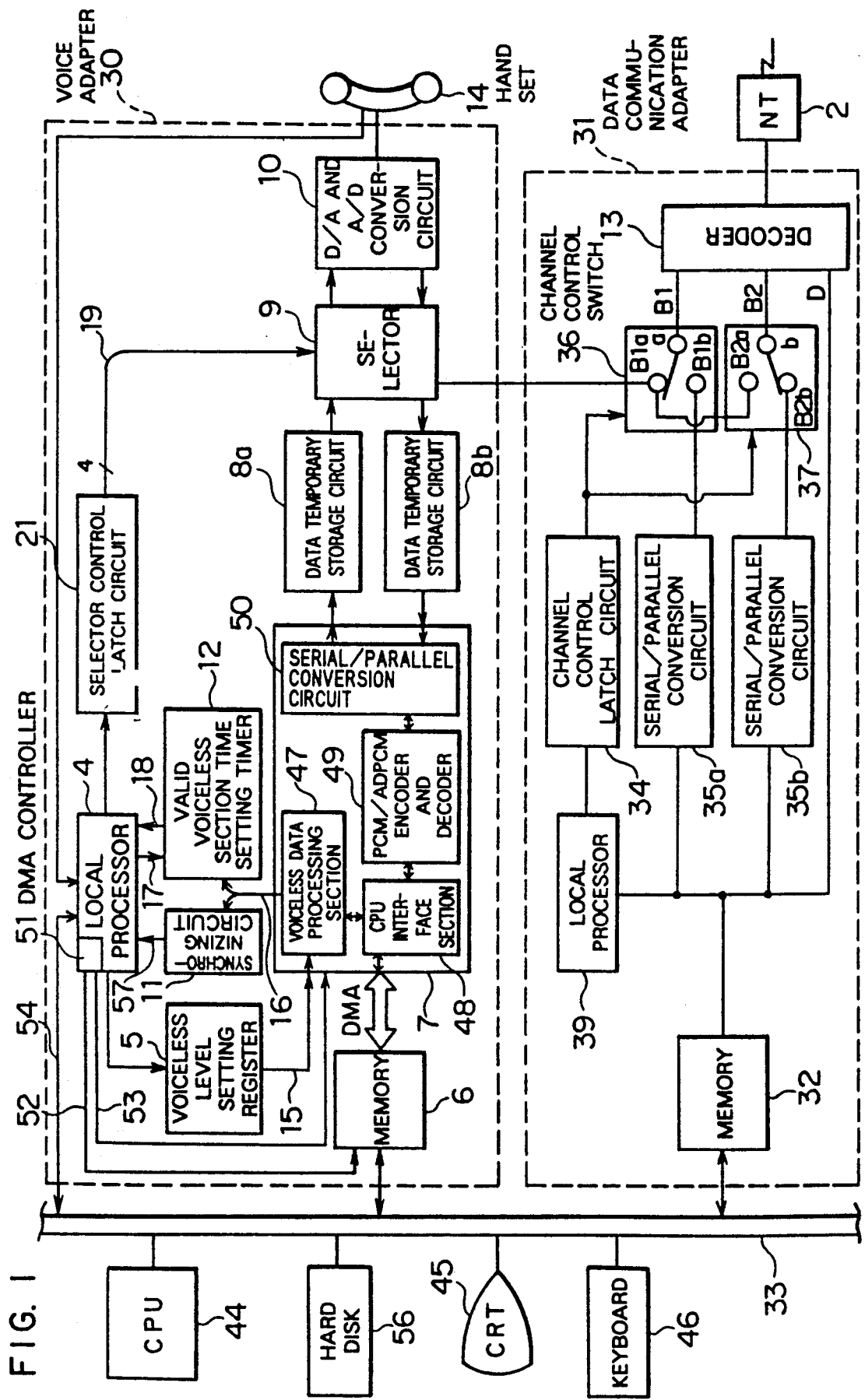
FIG. 1 is a block diagram showing one embodiment of the present invention.

FIG. 1 is a block diagram showing one embodiment of the TE 3 on which the ISDN communication control unit according to the present invention is loaded. As shown in FIG. 1, the TE 3 in this embodiment comprises a voice adapter 30 to which a hand set 14 is connected, a data communication adapter 31 which is connected to the NT 2, a CPU 44 which constitutes a main control section, a CRT 45 which constitutes a display section, a key board 46 as an input unit, a hard disk unit 56 as a storage unit, and a high order CPU bus 33 for connecting each of these units. In general, a facsimile and others may be connected, in addition to the above components, to the high order CPU bus 33, as is widely known.

The ISDN communication control unit according to the present invention comprises the voice adapter 30 and the data communication adapter 31. The voice adapter 30 comprises a local processor 4, a voiceless level setting register 5, a synchronizing circuit 11, a valid voiceless section time setting timer 12, a selector control latch circuit 21, a memory 6, a compression and expansion circuit 7, data temporary storage circuits 8a and 8b, a selector 9, and a D/A and A/D conversion circuit 10. A hand set 14 is connected to the D/A and A/D conversion circuit 10, as shown in FIG. 1. The data communication adapter 31 comprises a decoder 13, a memory 32, a channel control latch circuit 34, serial/-parallel conversion circuits 35a and 35b, a local processor 39, channel control switches 36 and 37, and a local processor 39. An NT 2 is connected to the decoder 13. Next, the outline of the operation of the voice adapter 30 will be explained.

Figure 3:
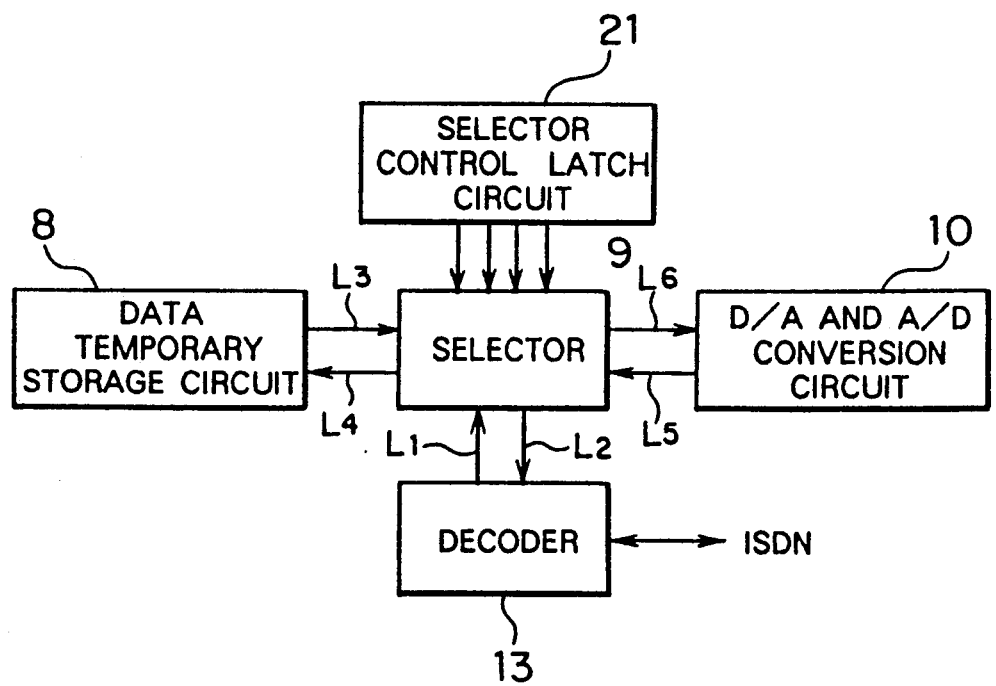
FIG. 3 is a block diagram showing the circuit configuration at the periphery of the selector within the voice adapter shown in FIG. 1.

First, the selector 9 within the voice adapter 30 will be explained in detail. This circuit is used to select a communication path between the data temporary storage circuits 8a and 8b, the D/A and A/D conversion circuit 10 and the data communication adapter 31, and is controlled by the selector control latch circuit 21. Suppose the channel control switch 36 of the data communication adapter 31 is being controlled so as to connect a contact point B1a with a contact point a. Then, circuits as shown in FIG. 3 are formed. In FIG. 3, L1 to L6 designate voice data lines. The latch control circuit 21 selects routes P1 to P8 for connecting voice data lines L1 to L6 between the data temporary storage circuits 8a and 8b, the D/A and A/D conversion circuit 10 and the decoder 13 within the decoder communication adapter 31, in accordance with the instruction from the local processor 4, as shown in FIGS. 4A, 4B, 4C and 4D.

Figure 4A:
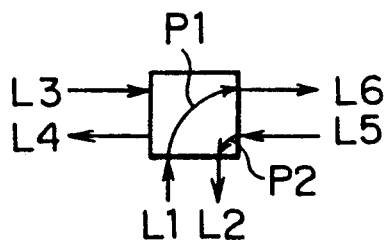
FIGS. 4A, 4B, 4C and 4D are explanatory diagrams showing routes to be set in the selector within the voice adapter shown in FIG. 1.

FIG. 4A shows a state that voice data transmitted from the ISDN through the decoder 13 is monitored by the hand set 14 through the route P1 of the selector 9 and the D/A and A/D conversion circuit 10, and the monitored voice data is returned intact to the ISDN through the route P2.

As described above, it is possible to use the ISDN communication control unit in almost the same manner as voice communication by a normal telephone set by arranging such that the selector selects the communication path as shown.

Figure 4B:
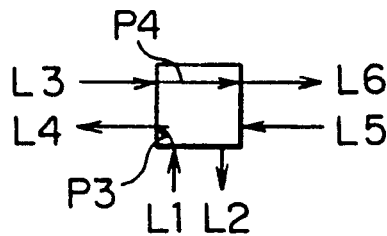

FIG. 4B shows a state that voice data transmitted from the ISDN is stored in the memory 9 through the decoder 13, the route P3 of the selector 9, the decoder temporary storage circuit 8b and the compression and expansion circuit 7, and the stored voice data is immediately read and is monitored by the hand set 14 through the compression and expansion circuit, the data temporary storage circuit 8a, the path P4 of the selector 9 and the D/A and A/D conversion circuit 10.

As described above, it is possible to monitor voice data while storing the voice sent from the other station by selecting the communication path. By the above arrangement, it becomes possible to use the ISDN communication control unit as a memory unit or as a housekeeping telephone set by storing the voice from the other station, through change-over of the connection from the state shown in FIG. 4A to the state shown in FIG. 4B when the line is busy in the connection of FIG. 4A, as an example.

Figure 4C:
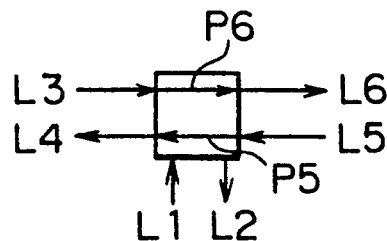

FIG. 4C shows a state that voice data inputted from the hand set 14 is stored in the memory through the route P5 of the selector, the data temporary storage circuit 8b and the compression and expansion circuit 7, and the stored voice data is immediately read and is monitored by the hand set 14 through the compression and expansion circuit 7, the data temporary storage circuit 8a, the route P6 of the selector 9 and the D/A and A/D conversion circuit 10.

By selecting the communication path as shown in FIG. 4C, it becomes possible, for example, to store the voice of the own station and to monitor the voice later. Through the monitoring of the voice of the own station, it becomes possible to set a time of a voiceless level and valid voiceless section as described later.

Figure 4D:
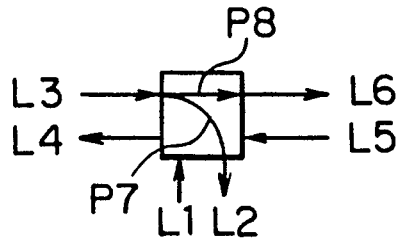

FIG. 4D shows a state that voice data stored in the memory 9 is read and transmitted to the ISDN through the compression and expansion circuit 7, the data temporary storage circuit 8a, the route P7 of the selector 9 and the decoder 13, and at the same time the voice data being transmitted to the ISDN is monitored by the hand set 14 through the route P8 of the selector 9 and the D/A and A/D conversion circuit 10.

By selecting the communication path as shown in FIG. 4D, it is possible to transfer voice data stored in the memory to the other station while monitoring the voice data. By the above arrangement, it becomes possible, for example, to use the ISDN communication control unit as a kind of a house-keeping telephone set by transferring the voice data (message) of the own station stored (recorded) in the connection of FIG. 4C, in the connection of FIG. 4D, or to use the ISDN communication control unit as a kind of a transfer telephone set for transferring a message from the other station stored in the connection of FIG. 4B, to a further separate station.

It is also possible to record the above voice data stored in the memory 6 in a hard disk 56 through the CPU bus 33.

Figure 5:
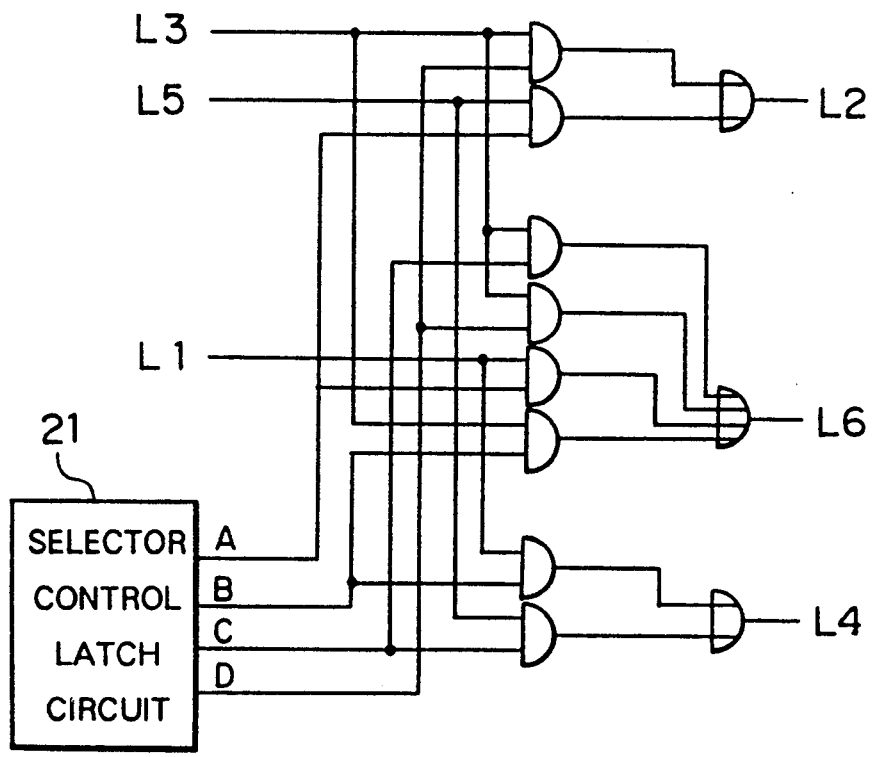
FIG. 5 is a time chart showing an example of storing voice data in the memory in the voice adapter shown in FIG. 1.

FIG. 5 is a circuit diagram showing the details of the above-described selector 9. When "1" is applied to each of the output terminals A to D of the selector control latch circuit 21, routes are selected as shown in FIGS. 4A to 4D. The local processor 4 indicates the contents of setting the selector 9 to the selector control latch circuit 21, and the selector control latch circuit 21 sets the routes of the selector 9 based on the indication of the local processor 4.

The data temporary storage circuits 8a and 8b within the voice adapter 30 shown in FIG. 1 temporarily store the voice data transmitted between the selector 9 and the compression and expansion circuit 7, respectively. By this arrangement, it becomes possible to transmit voice data without interruption even if a DMA transfer between the memory 6 and the compression and expansion circuit 7 has overflowed. As shown in FIG. 1, the compression and expansion circuit 7 comprises a voiceless data processing section 47, a CPU interface section 48, a PCM/ADPCM encoder and decoder 49 and a serial/parallel conversion circuit 50, and has a basic function of compressing voice data stored in the memory 6 and compressing the voice data outputted from the memory 6.

In the compression and expansion circuit of the present embodiment, the voiceless data processing section 47 is provided in which input voice data is identified whether it has voice or no voice based on a set level so that unnecessary voice data is not stored.

Figure 6:
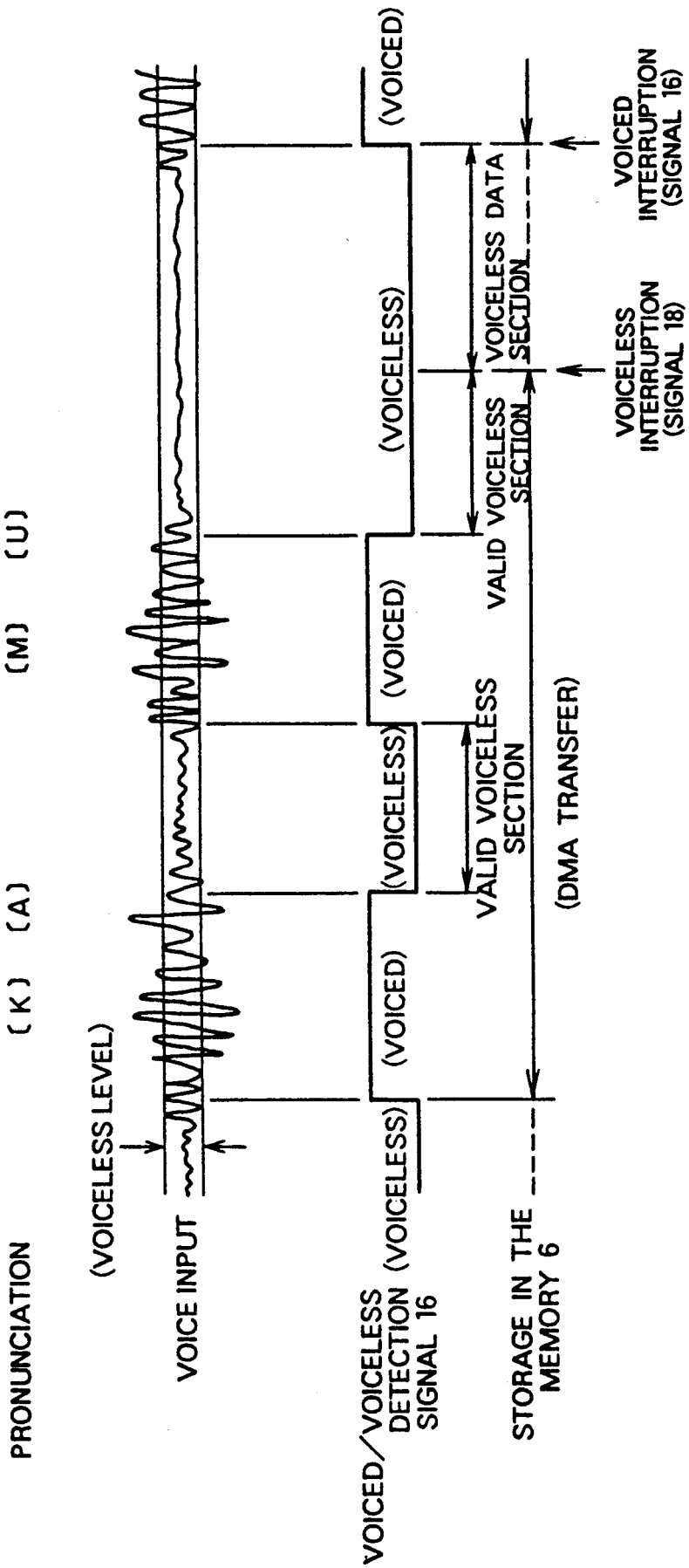
FIG. 6 is a time chart showing one example of storing voice data in the data temporary storage circuit and the memory in the voice adapter shown in FIG. 1.

The processing of a voice input will be explained with reference to FIG. 6 which is a time chart of input voice data, an output signal (voiced/voiceless detection signal 16) of the voiceless data processing section 4 and a storage state of voiced data in the memory. The voiceless data processing section discriminates a voice input between a voiced input of a voice level equal to or above a predetermined voice level and a voiceless input which is below this predetermined level, and produces a voiced/voiceless data detection signal 16. In FIG. 6, a word "KA-MU" in Japanese is taken as an example. The word "KA-MU" has two syllables of "KA" and "MU". Description will be made below by assuming that each one syllable is pronounced to express this one word.

In pronouncing the word "KA-MU", a consonant "K" is pronounced first, followed by a vowel "A". In this case, the pronunciation of "K" gradually becomes smaller to below a voiceless level. If the pronunciation of the portion of "A" below the voiceless level is not stored at all, it becomes difficult to listen to the pronunciation of "KA" at the time of a reproduction. To solve this problem, in the present embodiment, the continuation time of a vowel in the voiceless level which is necessary at the time of a reproduction is made a valid voiceless section, and voice data of the valid voiceless section is stored for a predetermined time length.

When "MU" is pronounced next, a voice input of the voiced and voiceless section is stored in the memory 6. A voice input of a voiceless level after a lapse of the valid voiceless section is not necessary for a reproduction, and therefore, this portion is not stored as a voiceless data section in the memory 6. In other words, in the present invention, a voice input which has been decided as voiceless is further discriminated between a valid voiceless data section and a voiceless data section so that only the voice input of the valid voiceless section is stored. The valid voiceless section time setting timer 12 for discriminating between the valid voiceless section and the voiceless data section will be explained later.

The storage operation of the compression and expansion circuit 7 will be explained below by referring to FIG. 1 again. A level handled as voiceless is set to the voiceless level setting register 5. Upon receiving the voiceless level which has been set as described above, the voiceless data processing section 47 decides voiced or voiceless of the input voice data and outputs the voiced/voiceless detection signal 16 to both the synchronizing circuit 11 and the valid voiceless section time setting timer 12. The synchronizing circuit 11 synchronizes the input voiced/voiceless detection signal 16 and outputs this synchronized signal to the local processor 4 through the line 57.

The valid voiceless section time setting timer 12 is a timer which counts the time of the valid voiceless section, to handle only the valid voiceless section (a voiceless section which is necessary at the time of a reproduction) as valid and to handle the voice data (a voiceless data section) after lapse of the valid voiceless section as invalid, when voice data is being continuously inputted. The time of this valid voiceless section is stored in the valid voiceless section time setting timer 12 by a valid voiceless section time setting signal 17 outputted from the local processor 4. By this arrangement, upon receiving the voiced/voiceless detection signal 16 outputted from the compression and expansion circuit 7, the valid voiceless section time setting timer 12 counts the valid voiceless section within the voiceless section, and outputs a voiceless interruption signal 18 to the local processor 4 when the valid voiceless section is exceeded. The local processor receives the synchronized voiced/voiceless detection signal 16 and the voiceless interruption signal 18 inputted through the line 57, and carries out DMA transfer control to the memory 6 over the voiced section and the valid voiceless section in the voiceless section. After the voiceless interruption signal is inputted, the local processor stops the DMA transfer and thereby prevents useless voice data from being stored in the memory 6. Accordingly, uneconomic use of the memory 6 can be effectively prevented.

In the present embodiment, only the voice data of the voiced section and the valid voiceless section are stored as described above. Therefore, at the time of a reproduction, the voiceless data section is handled as a voiceless state and is not reproduced and the next voiced data is immediately reproduced without an interval of a voiceless state.

As a separate embodiment, it is also possible to provide a register for counting and storing the length of the voiceless data section in the compression and expansion circuit 7, for example, so that an interval of the voiceless state is placed based on the value stored in this register and voice data is reproduced by handling the voiceless data section as a voiceless state at the time of a reproduction.

Figure 7:
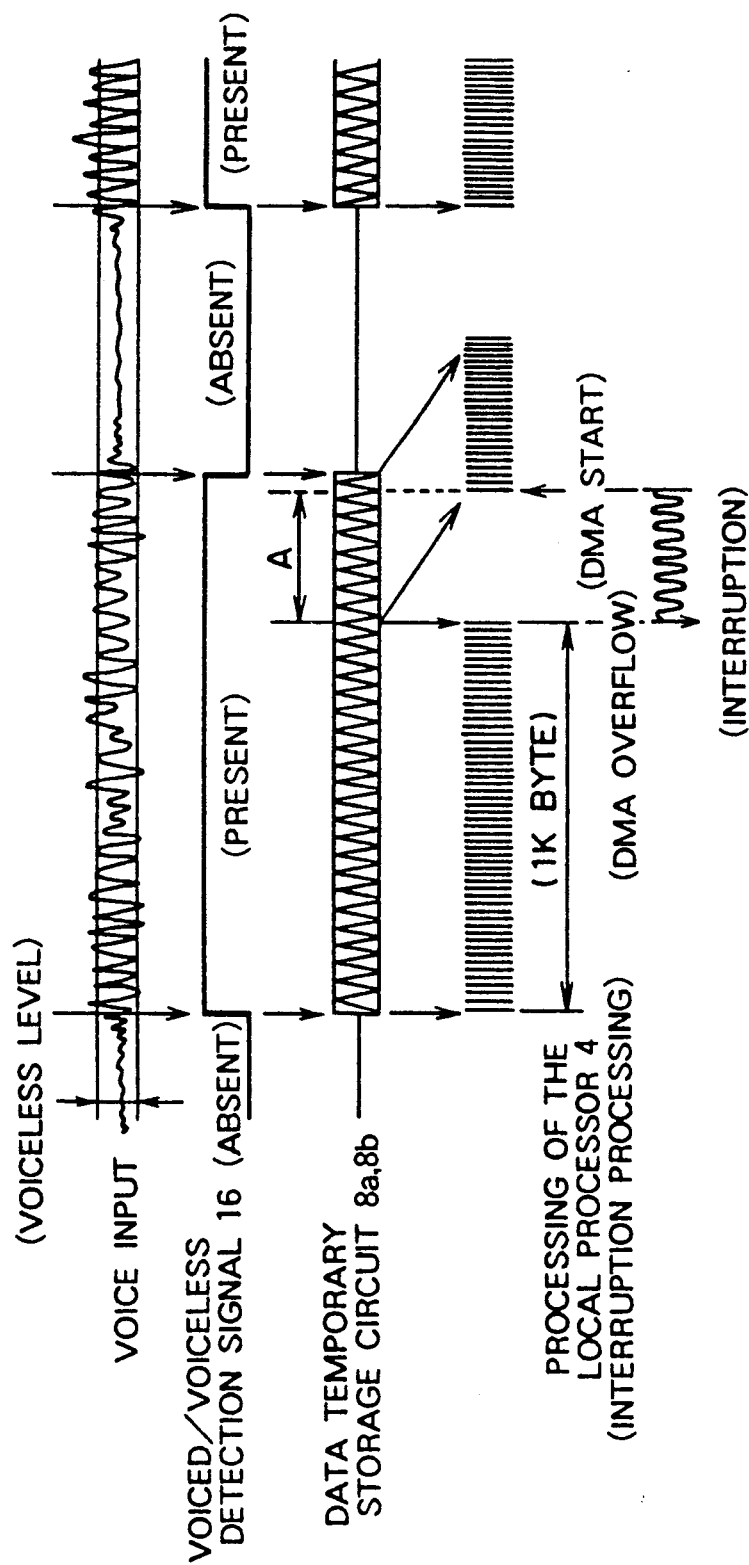
FIG. 7 is a flow chart showing an operation of the case where a DMA transfer between the memory and the compression and expansion circuit has overflowed in the voice adapter.

Next, detailed description will be made of the operation in the case where the DMA transfer between the memory 6 and the compression and expansion circuit 7 has overflown, with reference to FIG. 7. In this case, the selector 9 is in the connection state in FIG. 4B or FIG. 4C. When voice data is inputted from the ISDN 1 or from the hand set 14, the inputted voice data is stored in the data temporary storage circuit 8b through the selector 9. The stored voice data is immediately DMA transferred between the compression and expansion circuit 7 and the memory 6 as shown in FIG. 7. There is an upper limit to the number of bytes that can be transferred by one DMA starting (1 K bytes in the case of FIG. 7), and the data which exceeds this upper limit cannot be transmitted until the next DMA starting is carried out. The range of A shown in FIG. 7 is voice data which exceeds the above upper limit. However, in the present embodiment, the voice data exceeding the above upper limit is stored in the data temporary storage circuit 8b so that this data can be securely DMA transferred between the memory 6 and the compression and expansion circuit 7 by the next DMA starting. As a result, interruption or extinction of voice data inputted at the time of a DMA change-over can be effectively prevented.

Next, the outline of the operation of the data communication adapter 31 shown in FIG. 1 will be explained. The data communication adapter 31 is used to transmit or receive voice data and normal data such as image data other than voice data to or from the ISDN through the NT 2. In the case of transmitting or receiving voice data, the channel control switch 36 is controlled to connect the contact point B1a with the contact point a by the channel control latch circuit 34 based on the instruction of the local processor 39, as described above. In the case of transmitting or receiving normal data such as image data other than voice data, the channel control switches 36 and 37 are controlled to connect the contact point B1b with the contact point a and the contact point B2b with the contact point b by the channel control latch circuit 34 based on the instruction of the local processor 39. Serial/parallel conversion circuits 35a and 35b of the data communication adapter 31 shown in FIG. 1 are not relevant to the case of transmitting or receiving voice data to or from the ISDN, and therefore, description thereof is omitted here. The memory 32 stores normal data in the case of transmitting or receiving normal data such as image data to or from the ISDN, and this is not relevant to the transmission or receiving of voice data. Therefore, description of the memory 32 is also omitted here.

Next, the operation of the embodiment shown in FIG. 1 will be explained in detail with reference to FIGS. 8A, 8B to 12. The channels of the ISDN according to the present embodiment include a channel D for a control signal for line control and others and information channels B1 and B2.

Figure 8A:
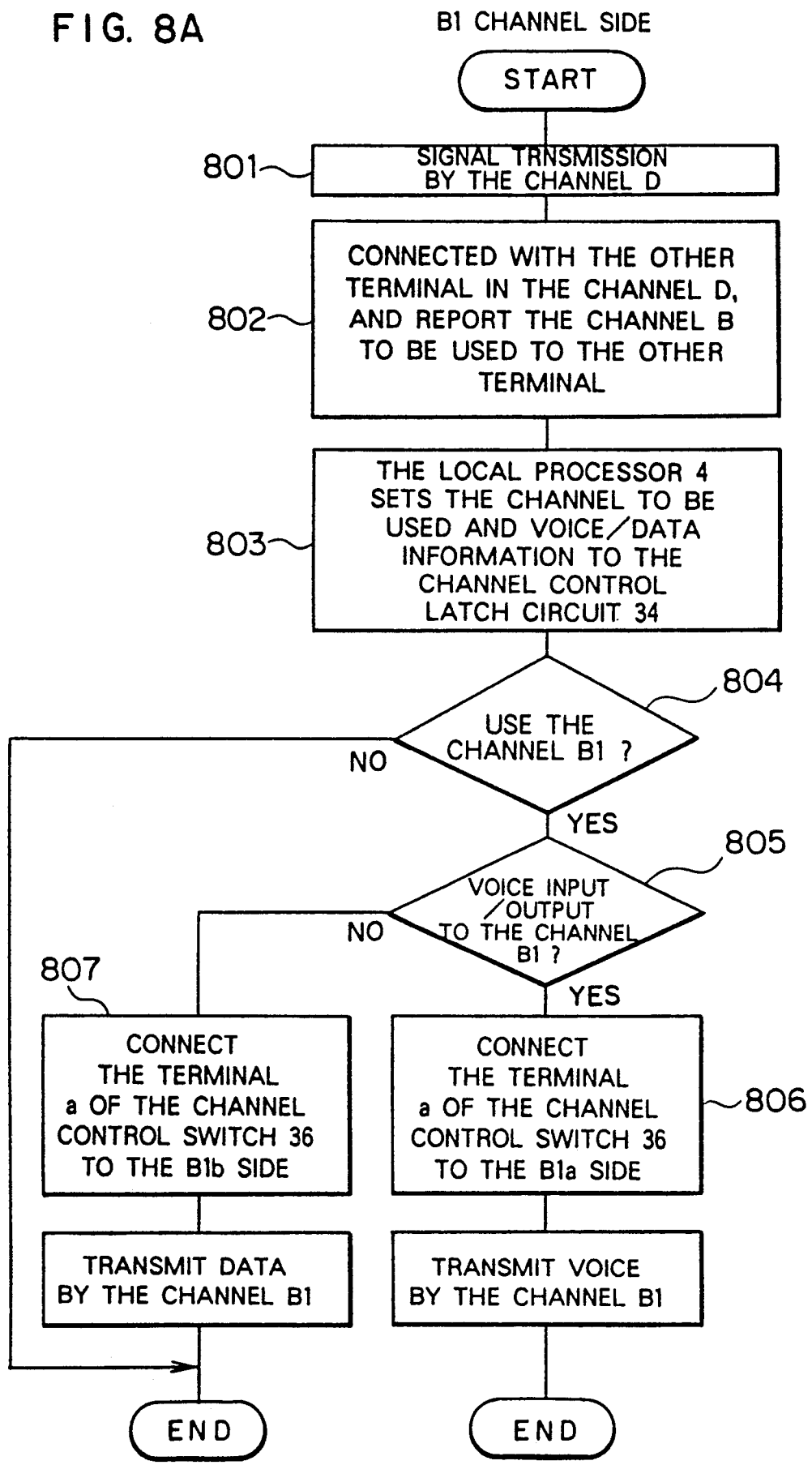
FIGS. 8A and 8B are flow charts showing an operation of the data transmission adapter in the case where data is transmitted from the data transmission adapter to the ISDN 1.
Figure 8B:
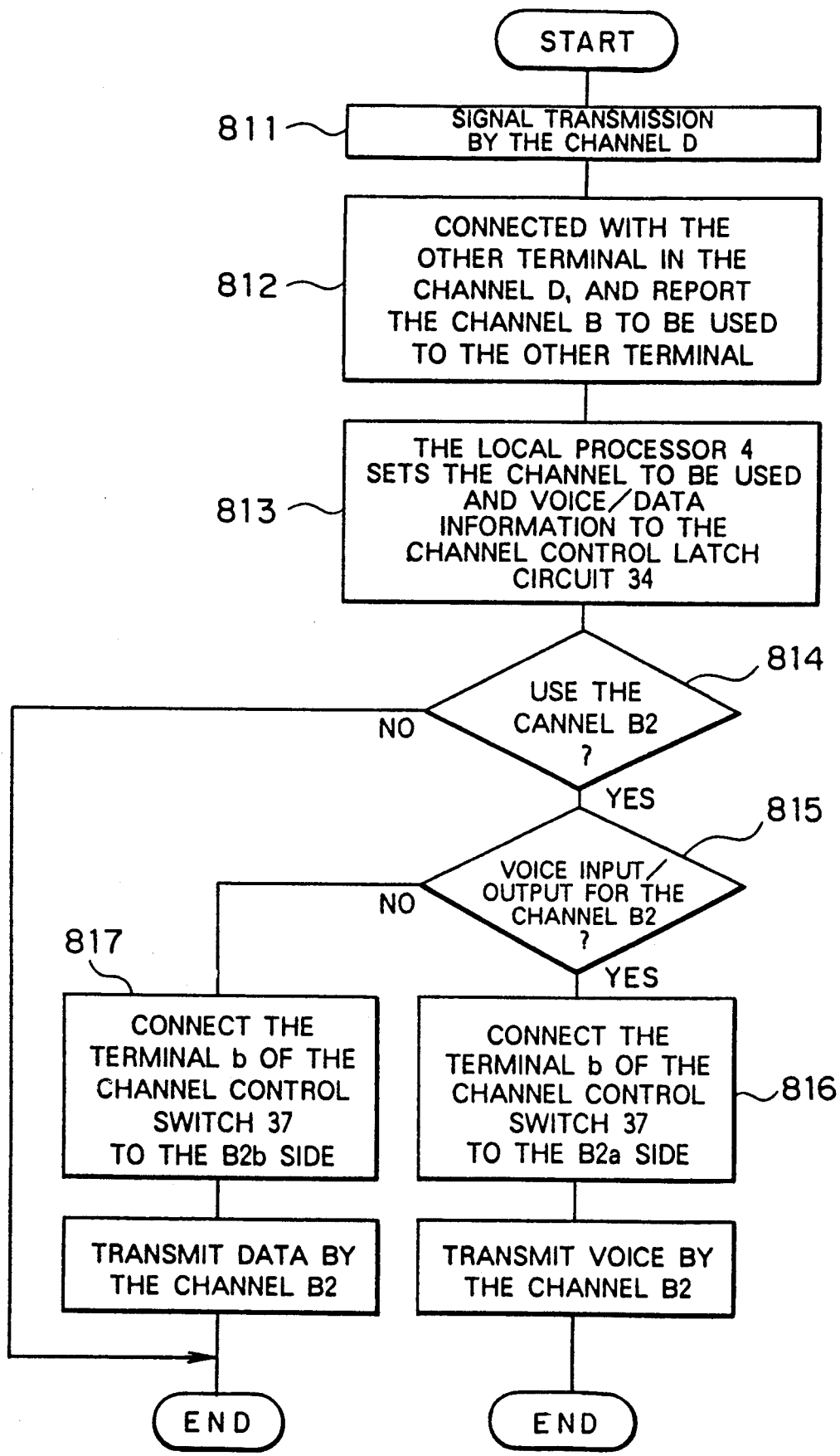

FIGS. 8A and 8B are flow charts showing the operation of the data transmission adapter 31 in the case of transmitting data from the data communication adapter 31 to the ISDN 1 through the NT 2. FIG. 8A shows a flow chart of the case where the channel B1 is used for data transmission, and FIG. 8B shows a flow chart of the case where the channel B2 is used for data transmission. As shown in FIGS. 8A and 8B, at the instruction of the CPU 44, the local processor 39 first transmits data to the other TE 3 by using the channel D (801), and the line is connected with the other TE 3 in the channel D and the channel to be used (B1 or B2) is reported to the local processor of the other TE 3 (802). Then, the local processor 39 of the source TE 3 sets data for changing over the channel control switches 36 and 37 to the channel control latch circuit 34 depending on the channel to be used and in accordance with whether data to be transmitted is voice information or normal data (803). Next, as shown in FIG. 8A, when the channel B1 is used (Yes in 804) and the data transmitted is voice data (Yes in 805), the terminal a of the channel control switch 36 is connected to the terminal B1a (806), and when the channel B1 is used and the data transmitted is normal data (No in 805), the terminal a of the channel control switch 36 is connected to the terminal B1b (807). As shown in FIG. 8B, when the channel B2 is used (Yes in 814) and the data transmitted is voice date (Yes in 815), the terminal b of the channel control switch 37 is connected to the terminal B2a (816), and when the channel B2 is used and the data transmitted is normal data (No in 815), the terminal b of the channel control switch 37 is connected to the terminal B2b (817). Thus, voice data and normal data are transmitted by using the channels B1 and B2, as shown in FIGS. 8A and 8B.

Figure 9:
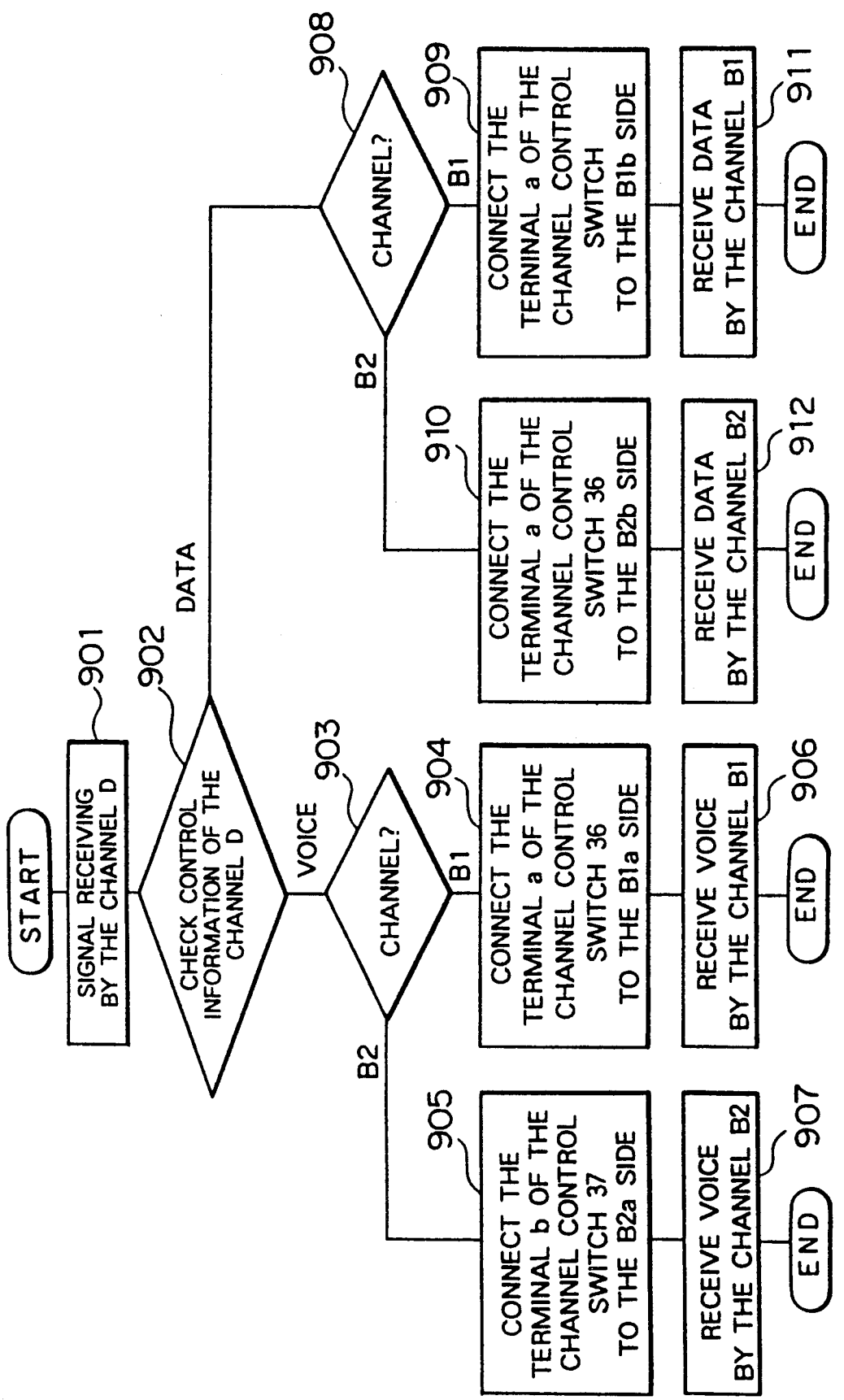
FIG. 9 is a flow chart showing an operation of the case where the channel D has arrived from the other TE through the ISDN and the data communication adapter receives voice data or normal data.

FIG. 9 is a flow chart showing the operation of the case where data has arrived from the other TE3 through the ISDN 1 by using the channel D and the data communication adapter 31 receives voice data or normal data. As shown in FIG. 9, when data has arrived through the channel D (901), the local processor 39 checks control information within the channel D and decides whether the data to be received is normal data or voice data (902). If the data to be received has been decided to be voice data, the local processor 39 checks the control information within the channel D and decides whether the channel to be used is B1 or B2 (903). When decision has been made that the channel B1 is used, the terminal a of the channel control switch 36 is connected with the terminal B1a by the channel control latch circuit 34 (904), and when decision has been made that the channel B2 is used, the terminal b of the channel control switch 37 is connected with the terminal B2a (905). By the above arrangement, voice data is received by using the channel B1 or B2 (906, 907). When decision has been made by the local processor 39 that the data to be received is normal data, control information within the channel D is checked and decision is made whether the channel to be used is the channel B1 or B2 (908). When decision has been made that the channel B1 is used, the terminal a of the channel control switch 36 is connected with the terminal B1b by the channel control latch circuit 34 (909), and when decision has been made that the channel B2 is used, the terminal b of the channel control switch 37 is connected with the terminal B2 (910). By the above arrangement, normal data is received by using the channel B1 or B2 (911, 912).

Figure 10:
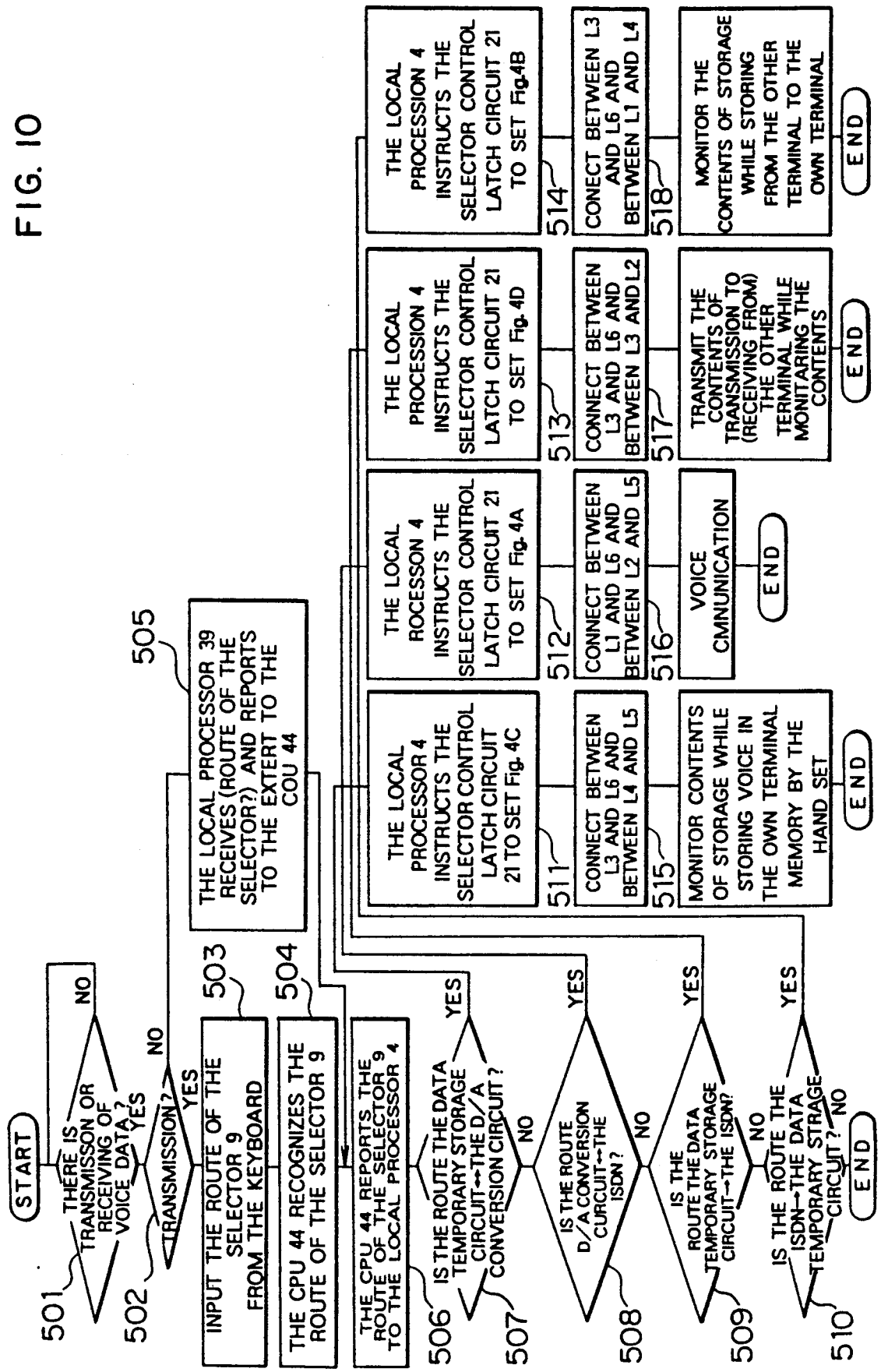
FIG. 10 is a flow chart showing the sequence for setting a route of the selector of the voice adapter shown in FIG. 1.

FIG. 10 is a flow chart showing the sequence for setting the route of the selector 9 of the voice adapter 30 shown in FIG. 1. As shown in FIG. 7, the CPU 44 waits until the occurrence of a transmission or a receiving of voice data. When a transmission or a receiving of voice data has occurred, decision is made whether it is a transmission or a receiving of data (502). When decision has been made that voice data has been transmitted, an instruction for setting a route of the selector 9 is inputted from the keyboard 46 (503), and the CPU 44 recognizes the route of the selector 9 (504). When decision has been made that voice data has been received (No in 502), the local processor 39 of the communication adapter 31 recognizes the route of the selector 9 from the control information of the channel D received through the NT 2 and the decoder 13, and reports the recognized route to the CPU 44 (505). Next, the CPU 44 reports the recognized or reported route to the local processor 4 (506). As shown in FIG. 7, the local processor 4 decides whether the route of the selector 9 connects the data temporary storage circuits 8a and 8b with the D/A and A/D conversion circuit 10 (reference FIG. 4C) (507), or whether the route of the selector 9 connects the D/A and A/D conversion circuit 10 with the ISDN (reference FIG. 4A) (508), or whether the route of the selector 9 connects the data temporary storage circuit 8a with the ISDN and connects the data temporary storage circuit 8a with the D/A and A/D conversion circuit 10 at the same time (reference FIG. 4D) (509), or whether the route of the selector 9 connects the ISDN with the data temporary storage circuit 8b and connects the data temporary storage circuit 8a with the D/A and A/D conversion circuit 10 at the same time (reference FIG. 4B) (510). Based on the result of this decision, the local processor 4 instructs the selector control latch circuit 21 to realize the route of the selector 9 instructed from the CPU 44, by the selector 9 (511 to 514). The selector control latch circuit 21 outputs the selector control signal 19 to the selector 9 and the route of the selector 9 is set as shown in FIG. 7 (FIGS. 4A to 4D) (515 to 518).

As explained for the block 505, in the present embodiment, it is possible to set the route of the selector 9 from the other station side by including control information of the selector 9 in the channel D.

In the present embodiment, the keyboard 46 is used as an input unit so that the route of the selector 9 is inputted. However, it is also possible to change over the route by having a further separate input unit in the hand set 14.

Figure 11:
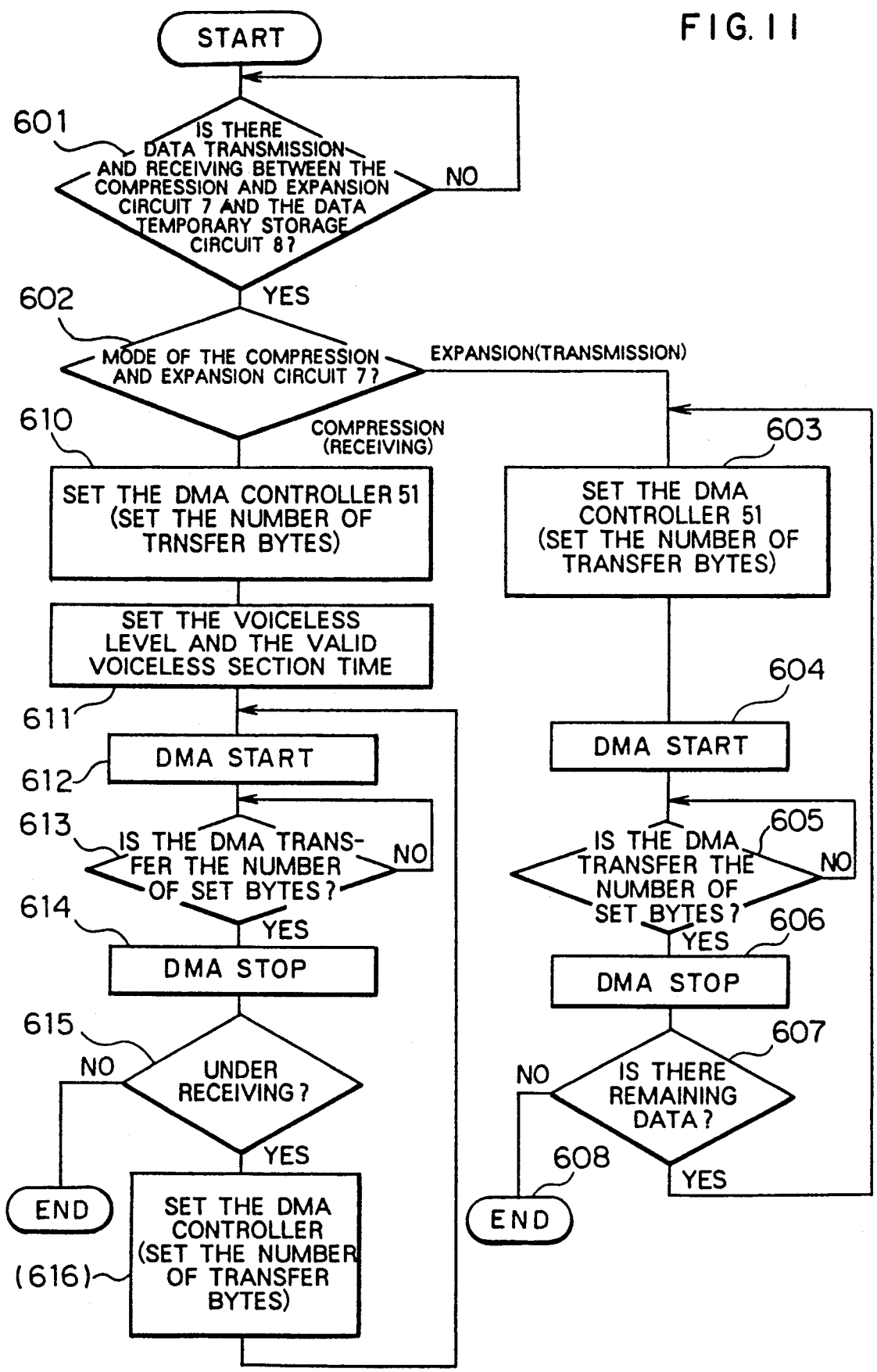
FIG. 11 is a flow chart showing DMA transfer control in the case where voice data is stored in the memory within the voice adapter or is read from the memory.

FIG. 11 is a flow chart showing the DMA transfer control in the case of storing voice data in the memory 6 or reading voice data from the memory 6. The local processor 4 decides whether data is being transmitted and received between the compression and expansion circuit 7 and the data temporary storage circuits 8a and 8b by monitoring the voiceless interruption signal 18 as shown in FIG. 7 (601). When a decision has been made that data is being transmitted and received between the compression and expansion circuit 7 and the data temporary storage circuits 8a and 8b (Yes in 601), a decision is made whether the mode of the compression and expansion circuit 7 is expansion (transmission) or compression (receiving) (602).

When a decision has been made that the mode is the expansion (transmission), the CPU 44 receives, the report to this extent from the local processor 4 through the high order CPU bus 33. Upon receiving the report, the CPU 44 sets the number of bytes of the voice data to be transmitted to the DMA controller 51 within the local processor 4 in one DMA transfer (603). The CPU 44 starts the DMA transfer to the local processor 4 through the high order CPU bus 33. Upon receiving the DMA transfer from the CPU 44, the local processor 4 starts DMA transfer of voice data between the memory 6 and the compression and expansion circuit 7 by using the two DMA control signals 52 (a R/W signal) and 53 (a control signal), by the working of the stored DMA controller 51 (604). When the number of the DMA transfer bytes has reached a set value (Yes in 605), the local processor 4 stops the DMA transfer (606). Next, a decision is made whether remaining voice data exists or not of which DMA transfer has not yet been done, by checking the compression and expansion circuit 7 (607), and when a decision has been made that there is no remaining voice data, the data transmission is terminated immediately (608).

When a decision has been made that there is remaining voice data (Yes in 607), the CPU 44 resets the DMA controller 51 through the high order CPU bus 33. The voice data stored in the data temporary storage circuit 8a is sequentially transmitted while the DMA controller 51 is being reset. Therefore, voice data which is being transmitted is not interrupted. Next, the CPU 44 starts DMA transfer to the local processor 4 through the high order CPU bus 33 (604). Similarly, DMA transfer is carried out until the number of DMA transfer bytes reaches a set value. When the DMA transfer has been terminated, a decision is made whether there is remaining voice data or not (607). If there is remaining data, the CPU 44 starts DMA transfer to the local processor 4, and this operation is repeated. If there is no remaining voice data, the data transfer is terminated.

Figure 12:
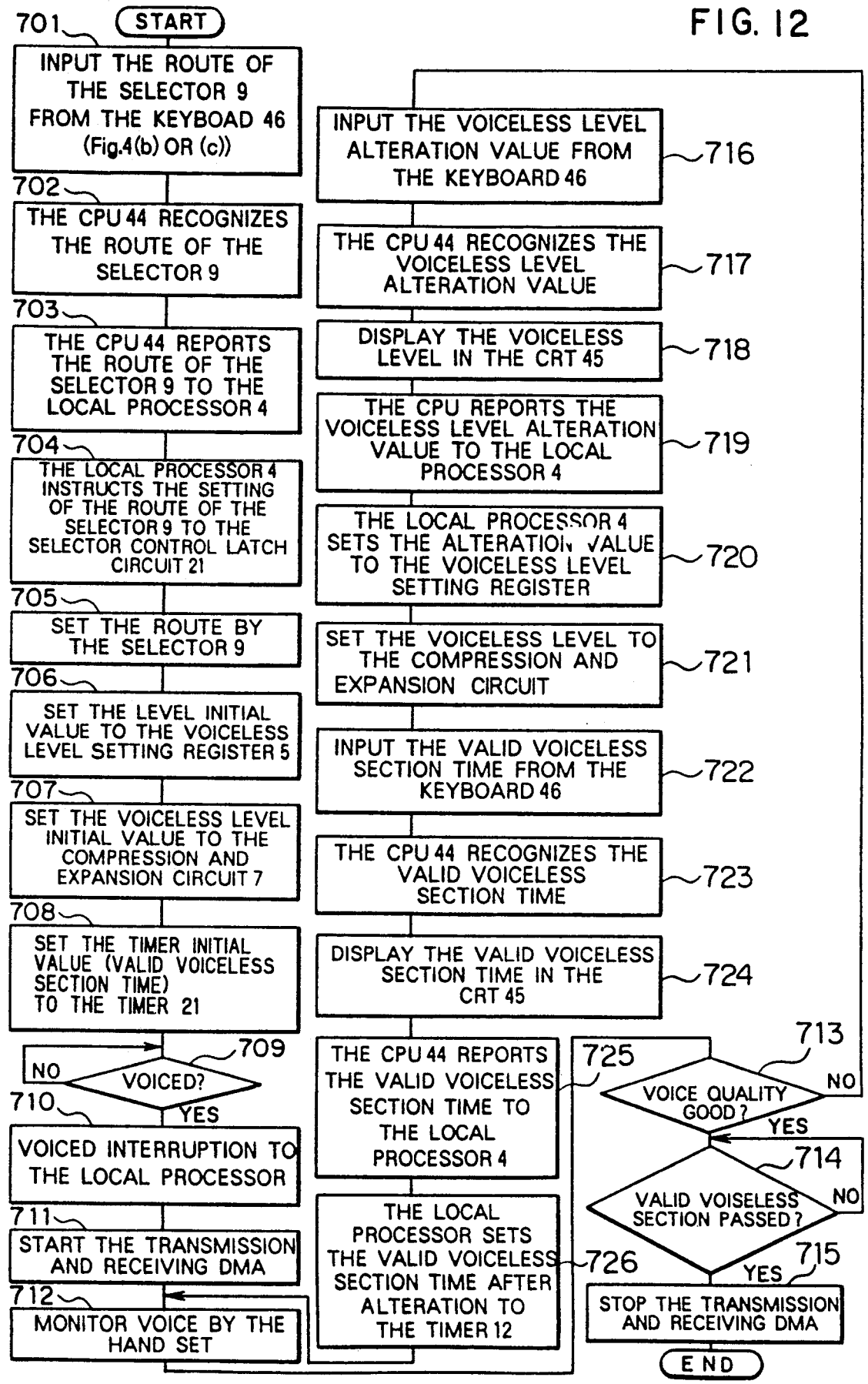
FIG. 12 is a flow chart in the case where a processing for changing voice quality is carried out when voice data is to be stored in the memory within the voice adapter.

When a decision has been made that the mode is the compression (receiving), the CPU 44 receives a report to this extent from the local processor 4 through the high order CPU bus 33. Upon receiving the report of the receiving of the voice data, the CPU 44 sets a number of bytes of the voice data to be transmitted to the DMA controller 51 of the local processor 4 through the high order CPU bus 33 in one DMA transfer (610). Next, the local processor 4 sets a voiceless level in the voiceless level setting register 5 and sets a valid voiceless section time in the valid voiceless section time setting timer 12 (611). These set values are predetermined. Next, the CPU 44 starts the DMA transfer to the local processor 4 through the high order CPU bus 33. Upon receiving the DMA starting from the CPU 44, the local processor 4 starts DMA transfer of voice data between the memory 6 and the compression and expansion circuit 7 by using the two DMA control signals 52 and 53, by the work of the stored DMA controller 51 (612). When the number of DMA transfer bytes has reached a set value (Yes in 613), the local processor 4 stops the DMA transfer (614). Next, the local processor 4 checks whether voice data is currently being received or not. When a decision has been made that no voice data is being received (No in 615), the data transfer is terminated. When a decision has been made that data is being received (Yes in 615), the CPU 44 resets the DMA controller 51 through the high order CPU bus 33 (616). The voice data which has been received during the resetting of the DMA controller 51 is sequentially stored in the data temporary storage circuit 8b and is transmitted to the compression and expansion circuit 7. Therefore, there is no interruption or extinction of the received voice data when it is stored in the memory 6. Next, the CPU 44 starts the DMA transfer to the local processor 4 through the high order CPU bus 33 (612). Similarly, the DMA transfer is continued until the number of the DMA transfer bytes reaches a set value. When the DMA transfer has been terminated, the local processor 4 checks whether voice data is currently being received or not (615). When a decision has been made that voice data is being received, the CPU 44 starts DMA transmission to the local processor 4, and this operation is repeated. When no voice data is being received, the data transmission is terminated. The ISDN communication control unit of the present embodiment can set a voiceless level and an invalid voice section at desired levels. The processing for changing sound quality at the time of storing voice data in the memory 6 will be explained below with reference to the flow chart in FIG. 12. As shown in FIG. 12, a key input is made to select a route of the selector 9 shown in FIG. 4B or 4C (a mode for monitoring voice data while storing it in the memory 6), by using the keyboard 46 connected to the CPU bus 33 (701). Next, the CPU 44 recognizes the key data relating to the route of the selector 9 inputted from the keyboard 46 (702). The CPU 44 reports the selected route of the selector 9 to the local processor 4 through the high order CPU bus 33 (703). The local processor 4 instructs the selector control latch circuit 21 to set the route of the selector 9 reported from the CPU 44 (704). Next, the route is set in the selector 9 (705). The local processor 4 sets a predetermined level initial value to the voiceless setting register 5 (706). The initial value set to the voiceless level setting register 5 is set to the voiceless data processing section 47 of the compression and expansion circuit 7 (707). Next, the local processor sets an initial value of a predetermined valid voiceless section time to the valid voiceless section time setting timer 12 by the valid voiceless section setting signal 17 (708).

Next, the voiceless data processing section 47 of the compression and expansion circuit 7 detects an input of voice data which exceeds the set level initial value, and waits until voiced data is detected. When voiced data has been detected (Yes in 709), the voiceless data processing section 47 outputs the voiced/voiceless detection signal 16 as "1", and reports the existence of voiced data to the local processor 4 through the synchronizing circuit 11 (710). Upon receiving the above report, the local processor 4 starts the DMA transfer of voiced data between the memory 6 and the compression and expansion circuit 7 (711), and starts storing of the voiced data in the memory 6. Next, the operator monitors the voiced data stored in the memory 6 through the data temporary storage circuit 8a, the selector 9 and the D/A and A/D conversion circuit 10, by using the hand set 14 (712). The operator carries out no processing when a decision has been made that the voice quality of the monitored voice is satisfactory (Yes in 713). In this case, the compression and expansion circuit 7 detects voiceless and outputs the voiced/voiceless data detection signal 16 as "0", then the valid voiceless section time setting timer 12 confirms a lapse of the valid voiceless section (Yes in 714) and the voiceless interruption signal 18 is inputted to the local processor 4. As a result, the local processor 4 steps the DMA transfer of the voiced data between the memory 6 and the compression and expansion circuit 7 (715).

When the operator has decided that the voice quality of the voice is not good (No in 713), the next processing is carried out. In other words, the operator inputs an updated value of the voiceless level set to the voiceless level setting register 5, by using the keyboard 46 (716). Next, the CPU 44 recognizes the above updated value which has been inputted (717), and displays the updated value in the CRT 45 through the high order CPU bus 33 (718). Next, the CPU 44 reports the above updated value to the local processor 4 (719), and the local processor 4 sets the above updated value to the voiceless level setting register 5 (720). The updated value set to the voiceless level setting register 5 is set to the voiceless data processing section 47 of the compression and expansion circuit 7 (721).

Next, the operator inputs the updated value of the valid voiceless section time set to the valid voiceless section time setting timer 12, by using the keyboard 46 (722). Next, the CPU 44 recognizes the above inputted updated value (723) and displays the updated value in the CRT 45 through the high order CPU bus 33 (724). Next, the CPU 44 reports the above updated value to the local processor 4 (725), and the local processor 4 sets the above updated value within the valid voiceless section time setting timer 12, by using the valid voiceless section setting signal 17 (726).

After the above processing, the operator decides the voice quality of the monitored voice, by the hand set 14 again (712). When the voice quality is poor or when voice is hard to listen to, the operator inputs an updated value of the voiceless level and an updated value of the valid voiceless section from the keyboard 46 and monitors the voice by using the hand set 14 again, thus repeating a series of operation. When a decision has been made that the voice quality is good as a result of a monitoring by using the hand set 14, the local processor 4 stops the DMA transfer of the voice data between the memory 6 and the compression and expansion circuit 7 after the lapse of a valid voiceless section (715), thus terminating the series of processing.

As is clear from the above description, according to the present embodiment, it is possible to change over the route within the selector 9 and to freely set the voice input and output routes by the work of the local processor 4 and the selector control latch circuit 21.

Further, the voice data storage level can be controlled depending on the contents of the voiceless level setting register 5 and the contents of the valid voiceless section time setting timer 12, and the stored voice data can be monitored by the hand set 14, so that the voice data can be freely changed to meet the level of the operator's preference. Accordingly, by checking the voice quality of the voice data to be stored, it is possible to store the voice data which matches the sense of hearing of the operator as an individual. Further, when the remaining capacity of the memory is small, it is also possible to store voice data to match the remaining capacity. Further, since voice data is temporarily stored in the data temporary storage circuit 8a and 8b, the voice data will not be interrupted or extinguished even if the DMA transfer has overflowed.

Further, the freedom of communication improves because the channel control switch can be changed over freely to match the channels B1 and B2 which are used for the transmission and receiving of data based on the control information of the channel D in the communication adaptor 31.

Although the selector 9 of the present embodiment has been explained with reference to the connections in FIGS. 4A to 4D, the present invention is not limited to these and can include further various connections. Further, although the ISDN is structured by the channels D, B1 and B2 in the present embodiment, the present invention can also be applied to the ISDN which is structured by other channels.

While particular embodiments of the present invention have been shown and described, it will be obvious to those skilled in the art that various changes and modifications may be made without departing from the present invention in its broader aspects.

What is claimed is:

1. A communication control unit for an ISDN, provided within a terminal for carrying out data communication including voice data communication with another terminal through the ISDN, comprising: a data communication adapter for transmitting and receiving voice data to and from the ISDN; and a voice adapter for receiving voice data received from the ISDN through the data communication adapter and storing the received voice data in a memory device; said voice adapter including:
   memory control means for determining whether received voice data is (i) within a first predetermined range so as to be valid voice data, or (ii) outside of the first predetermined range so as to be voiceless data, further determining whether the voiceless data is within a second predetermined range so as to be valid voiceless data, and storing in said memory device only the voice data which has been determined to be the valid voice data and the valid voiceless data.

2. A communication control unit for an ISDN provided within a terminal for carrying out data communication including voice data communication with another terminal through the ISDN, the communication control unit comprising:
   a data communication adapter for transmitting and receiving voice data to and from the ISDN; and
   a voice adapter for receiving voice data received from the ISDN through the data communication adapter and storing the receiving voice data in a memory device, said voice adapter including,
   monitor means for monitoring voice data,
   temporary storage means for temporarily storing voice data,
   communication path selection means for selecting a communication path to allow transmission and reception of voice data (i) between said data communication adapter and said voice data temporary storage means, (ii) between said communication adapter and said monitor means and, (iii) between said monitor means and said voice data temporary storage means, respectively, and
   memory control means for determining whether the received voice data is (i) within a first predetermined range so as to be valid voice data, or (ii) outside of the first predetermined range so as to be voiceless data, further determining whether the voiceless data is within a second predetermined range so as to be valid voiceless data, and storing in said memory device only the voice data which has been determined to be the valid voice data and the valid voiceless data.

3. A communication control unit for an ISDN provided within a terminal for carrying out data communication including voice data communication with another terminal through a channel D for a control signal and channels B1 and B2 for information of the ISDN, the communication adapter control unit comprising:
   a data communication adapter for transmitting and receiving data to and from the ISDN, the data communication adapter including,
      means for analyzing contents of the channel D received from said ISDN, deciding whether the received data is voice data or data other than voice data and deciding whether the channel used for receiving data is the channel B1 or the channel B2, and
      switching means for changing over a destination of inputted data in accordance with a result of said decision; and
   a voice adapter for receiving voice data received from the ISDN through said data communication adapter and storing the received data in a memory device, the voice adapter including,
   monitor means for monitoring the voice data,
   temporary storage means for temporarily storing the voice data,
   communication path selection means for selecting a communication path to allow transmission and reception of the voice data (i) between said communication adapter and said monitor means and, (iii) between said monitor means and said voice data temporary storage means, respectively, and
   memory control means for determining whether the receiving voice data is (i) within a first predetermined range so as to be valid voice data, or (ii) outside of the first predetermined range so as to be voiceless data, further determining whether the voiceless data is within a second predetermined range so as to be valid voiceless data, and storing in said memory device only the voice data which has been determined to be the valid voice data and the valid voiceless data.

4. A communication control unit for an integrated service digital network (ISDN), including a data communication adapter for transmitting and receiving data to and from the ISDN and a voice adapter for transmitting and receiving voice data received from the ISDN through said data communication adapter, said voice adapter including:
   memory means, for storing the voice data, connected to a bus of a main control section of terminal equipment;
   compression and expansion means, for compressing or expanding the voice data, connected to said memory means;
   temporary storage means, for temporarily storing the voice data, connected to said compression and expansion means;
   monitor means for monitoring the voice data;
   communication path selection means for selecting a communication path to allow transmission and reception of voice data (i) between said data communication adapter and said temporary storage means, (ii) between said data communication adapter and said monitor means and, (iii) between said monitor means and said temporary storage means, respectively;
   input means for inputting control information to a control means; and
   the control means for controlling each of aid means, which controls said communication path selection means based on the control information inputted by said input means, and transmits and receives the voice data with the ISDN through said temporary storage means, said monitoring means and said data communication adapter, using the selecting means to change the communication path.

5. A communication control unit for the ISDN according to claim 4, wherein said compression and expansion means is controlled by the control means, to read/write voice data from and to said memory means by direct memory access (DMA).

6. A communication control unit for the ISDN according to claim 4, wherein said voice adapter further includes:

a level decision means for deciding whether inputted voice data is valid voice data or voiceless data based on a level set in advance; and voiceless time decision means connected to the level decision means, for counting an amount of voiceless time and deciding whether the voiceless time exceeds a preset time or not;

said control means using a result of the decision from said voiceless time decision means and storing in said memory means only valid voice data and valid voiceless data wherein the valid voiceless data is voiceless data within said preset voiceless time.

7. A communication control unit for the ISDN according to claim 6, wherein a set level of said level of decision means and the set time of said voiceless time decision means are set by said input means.

8. A communication control unit for the ISDN according to claim 4, wherein said adapter for data communication includes:

decode means for decoding a signal from the ISDN into a channel D for a control signal and channels B1 and B2 for data;

connection means for connecting said channel B1 or channel B2 to said voice adapter; and data communication adapter control means for controlling said connection means, which analyzes contents of said channel D, decides whether the channel to be used is the channel B1 or the channel B2, controls said connection means and connects any one of the channels B1 and B2 through which voice data is being transmitted, to said voice adapter.

9. A control method for a communication control unit for an integrated service digital network (ISDN) in a voice data adapter the method including:

a step for inputting information to a change-over unit relating to a change-over operation of the change-over unit;

a step for changing over a communication path of voice data between a temporary storage circuit, a monitor unit and the ISDN by said change-over unit based on said input information;

a step of temporarily storing the voice data from/to said change-over unit in said temporary storage circuit;

a step for compressing/expanding the voice data from/to said temporary storage circuit by a compression and expansion circuit;

a step for writing/reading the voice data from/to said compression and expansion circuit in a memory; and a step for monitoring the voice data from said change-over unit and transmitting the voice data to said change-over unit.

10. A control method for a communication control unit for the ISDN according to claim 9, wherein the method further includes:

a step for deciding valid voice data and voiceless data based on a level of inputted voice data; and a step of deciding whether an amount of time of the voiceless data excess a set time or not;

said step for writing voice data in the memory is for writing only valid voice data and valid voiceless data wherein the valid voiceless data is voiceless data not exceeding the set time.

11. A control method for a communication control unit for the ISDN according to claim 9, wherein the method further includes:

a step for decoding a signal from the ISDN into a channel D for a control signal and channels B1 and B2 for data;

a step for analyzing contents of the channel D, deciding whether receiving data is voice data or not and deciding whether a channel used in the channel B1 of the channel B2; and a step for connecting any one of the channels B1 and B2 through which voice data is being transmitted, to said voice adapter based on a result of said decision.

12. A control method for a communication control unit for the ISDN according to claim 10, wherein the method further includes:

a step for decoding a signal from the ISDN into a channel D for a control signal and channels B1 and B2 for data;

a step for analyzing contents of said channel D, deciding whether received data is voice data of or not and deciding whether a channel used is the channel B1 or the channel B2; and a step for connecting any one of the channels B1 and B2 through which voice data is being transmitted, to said voice adapter based on a result of said decision.

* * * * *

UNITED STATES PATENT AND TRADEMARK OFFICE
CERTIFICATE OF CORRECTION

PATENT NO. : 5,267,245
DATED : November 30, 1993
INVENTOR(S) : Kazuhiko Maruyama, et al.

It is certified that error appears in the above-identified patent and that said Letters Patent is hereby corrected as shown below:

Claim 3, column 16, line 13, after "said" insert --data--; and, line 14, after "adapter" insert --and said voice data temporary storage means, (ii) between said communication adapter--.

Claim 4, column 16, line 54, delete "aid" and substitute therefor --said--.

Claim 4, column 16, line 60, delete "selecting" and substitute therefor --selection--.

Signed and Sealed this

Nineteenth Day of April, 1994

Attest:

BRUCE LEHMAN

*Attesting Officer*  *Commissioner of Patents and Trademarks*